United States Patent
Fujii et al.

[11] Patent Number: 6,166,795
[45] Date of Patent: Dec. 26, 2000

[54] LIQUID CRYSTAL DISPLAY APPARATUS INCLUDING A CONDUCTIVE LAYER ON AN ARRAY SUBSTRATE THEREOF

[75] Inventors: Masayuki Fujii; Fumio Matsukawa; Akira Tsumura; Shin Tahata; Masaya Mizunuma; Akira Tamatani; Yasuhiro Morii, all of Tokyo; Yasuo Fujita, Kumamoto, all of Japan

[73] Assignees: Mitsubishi Denki Kabushiki Kaisha, Tokyo; Advanced Display Inc., Kikuchi-gun, both of Japan

[21] Appl. No.: 09/237,663

[22] Filed: Jan. 27, 1999

[51] Int. Cl.⁷ ........................ G02F 1/1343; G02F 1/1333
[52] U.S. Cl. ............................ 349/141; 349/143; 349/111
[58] Field of Search .................................. 349/141, 143, 349/111

[56] References Cited

U.S. PATENT DOCUMENTS

| | | | |
|---|---|---|---|
| 4,181,563 | 1/1980 | Miyaka et al. | 156/643 |
| 5,492,762 | 2/1996 | Hirai et al. | 428/447 |
| 5,598,285 | 1/1997 | Kondo et al. | 349/39 |
| 5,718,992 | 2/1998 | Sato et al. | 430/7 |
| 5,781,261 | 7/1998 | Ohta et al. | 349/111 |
| 5,805,247 | 9/1998 | Ohe et al. | 349/42 |
| 5,852,485 | 12/1998 | Shimada et al. | 349/141 |
| 5,870,160 | 2/1999 | Yanagawa et al. | 349/141 |
| 5,980,851 | 11/1999 | Suga et al. | 423/412 |
| 5,990,987 | 11/1999 | Tanaka | 349/43 |
| 6,014,196 | 1/2000 | Anzaki et al. | 349/137 |
| 6,049,369 | 4/2000 | Yanagawa et al. | 349/141 |

*Primary Examiner*—William L. Sikes
*Assistant Examiner*—Tarifur R. Chowdhury
*Attorney, Agent, or Firm*—Oblon, Spivak, McClelland, Maier & Neustadt, P.C.

[57] ABSTRACT

A liquid crystal display apparatus of the present invention includes an array substrate, a counter substrate, and liquid crystal that is interposed and held by a space formed by maintaining the array substrate and the counter substrate at a specified interval in a parallel manner, the liquid crystal display apparatus being of in-plane switching in which voltage is impressed on a pair of electrodes disposed on the array substrate to generate an electric field substantially parallel with respect to the array substrate surface and in which liquid crystal is driven through in-plane switching of liquid crystal molecules, wherein the array substrate is formed with a conductive film layer on a surface opposite to the surface on which the pair of electrodes are disposed. Providing a liquid crystal display apparatus with no electric charged being stored on the substrate surface thereof and no afterimages appear.

3 Claims, 9 Drawing Sheets

1

LIQUID CRYSTAL DISPLAY APPARATUS INCLUDING A CONDUCTIVE LAYER ON AN ARRAY SUBSTRATE THEREOF

BACKGROUND OF THE INVENTION

1. Field of the Invention

The present invention relates to a liquid crystal display apparatus. More particularly, the present invention relates to a liquid crystal display apparatus of favorable display quality with no afterimages.

2. Discussion of the Background

Liquid crystal display apparatuses are being widely used in watches or electronic desk calculators due to their properties of being, for instance, thin-sized, light-weighted and of consuming low electricity. Especially twisted nematic (hereinafter referred to as "TN") liquid crystal display apparatuses which perform active driving through, for instance, thin film transistors (hereinafter referred to as "TFT") are employed for use as display devices of word processors or personal computers as well as of televisions, and they are gradually replacing CRTs (cathode ray tubes) which had been most generally used as display devices so far.

However, such a TN liquid crystal display apparatus generally presents drawbacks in that its visual angle is narrow, in that the contrast is degraded when seen from oblique directions, and in that gray scale are observed in such a state as to be reversed. Accompanying the large-sizing of liquid crystal display devices in these days, it is especially desired for wider visual angles since differences in display occur even in the case of observing the lateral and vertical ends of the display surface from the same observing point.

While display is performed in a TN liquid crystal display device by utilizing the property of liquid crystal molecules which are aligned owing to electric field, anisotropy in aligning directions is considered to cause degradations in display quality when seen from oblique directions. That is, in case liquid crystal molecules which are aligned from a single direction are looked at from various directions, their optical contributions are changed so that variations in display occur depending on visual angles. This may be considered to be an essential problem of TN liquid crystal display devices.

For coping with this problem, it has been provided for an in-plane switching liquid crystal display device an example of which is disclosed, for instance, in Japanese Examined Patent Publication No. 21907/1988 or International Publication No. WO 91/10936. This in-plane switching liquid crystal display device is arranged in such a manner that a pair of comb-like shaped electrodes are formed on a single substrate, an electric field is generated to be parallel to the surface of the substrate, and liquid crystal molecules are made to be switched through changes in this electric field. Since the liquid crystal molecules rotate in a parallel manner with respect to the substrate surface along the electric field, the angle with respect to the substrate surface is small. Therefore, changes in display depending on visual angles hardly occur when the liquid crystal molecules are looked at from various directions. Such an in-plane switching liquid crystal display device is manufactured by overlapping the substrate with the comb-like shaped electrodes with a counter substrate, connecting these through an adhesive, injecting a liquid crystal material between these two substrates and adhering a polarizer thereon.

FIG. 15 is a sectional explanatory view of a cell of an in-plane switching liquid crystal display device which array substrate is not conductive. In FIG. 15, numerals 1a and 1b denote alignment layers, numeral 2 a color filter protecting layer, numeral 3 a color filter, numeral 4 comb-like electrodes, numeral 6 a polarizer, numeral 7a and 7b glass substrates, numeral 8 a counter substrate, numeral 10a and 10b regions electrified with electric charge, and numeral 11 a crystal liquid layer. Numerals 10a and 10b denote regions in which electric charge is partially distributed. For instance, in case region 10a is electrified to be (+), region 10b is electrified to be (−). The amount of electrification is identical in positive and negative. In case electric charge is applied through static electricity generated, for instance, through rubbing the surface of the liquid crystal display device, electric charge on the counter substrate is neither diffused nor eliminated to outside the substrate since the counter substrate is not conductive, so that regions are generated in which electric charge is partially stored as shown at 10a and 10b. Such a partial storage of electric charge causes electric discharge on the substrate which in turn lead to damages or destruction of substrates or TFTs. Thus, there are known examples in which conductive films are provided in conventional TN liquid crystal display devices for preventing storage of electric charge and in which any of their components is made to be conductive (see Japanese Unexamined Patent Publication No. 60512/1992, Japanese Unexamined Patent Publication No. 245220/1992, Japanese Unexamined Patent Publication No. 263123/1985, Japanese Unexamined Patent Publication No. 235919/1991, Japanese Unexamined Patent Publication No. 56625/1988 or Japanese Unexamined Patent Publication No. 232459/1993). However, all of these conventional liquid crystal display devices differ from in-plane switching liquid crystal display devices, for instance, in their arrangements of electrodes formed on the substrates, and since they do not employ a driving method in which liquid crystal molecules are made to be switched by utilizing an electric field which is parallel to the substrate surface, they are not effective in achieving the above discussed points of expanding the visual angle and decreasing changes in display depending on visual angles.

The significance of eliminating partial storage of electric charge in the present invention lies in the point that it has made it possible to realize a significantly improved in-plane switching type liquid crystal display device in which a visual angle could be remarkably enlarged.

The relationship between partial storage of electric charge and movements of liquid crystal molecules will now be explained. In an in-plane switching liquid crystal display device, partial storage of electric charge causes the presence of portions on which electric charge is being stored and portions on which it is not. Differences in aligning angles of liquid crystal molecules are generated on portions on which electric charge is being stored and portions on which it is not. It is presumed that this phenomenon causes recognition of afterimage and remarkably degrades the display quality.

In an in-plane switching liquid crystal display device, a pair of comb-like shaped electrodes are formed on one substrate, and the other substrate (hereinafter referred to as "counter substrate") does not have a conductive portion. Thus, in the case electric charge is applied from the exterior through, for instance, static electricity, electric charge is partially stored on the counter substrate without being diffused nor without being eliminated to outside the substrate. That is, there are generated portions on which electric charge is being stored and portions on which it is not. Differences in rising angles of liquid crystal molecules are generated on portions on which electric charge is being stored and portions on which it is not. This phenomenon causes problems that afterimages are recognized and the display quality is remarkably degraded. The present invention has been made to solve these problems, and it is an object thereof to provide a liquid crystal display device on which no electric charge is partially stored and on which no afterimages are generated.

SUMMARY OF THE INVENTION

A liquid crystal display device of the present invention is a liquid crystal display device in which a liquid crystal material is interposed and held between two substrates, in which voltage is applied on a pair of comb-like shaped electrodes disposed on a single substrate, and in which a birefringence of a liquid crystal layer is changed through an electric field that is generated in a substantially parallel direction with respect to a substrate surface to perform display, wherein the provision of a conductive layer in an array substrate makes it possible, in case electric charge is supplied from the exterior through static electricity or the like, to partially store electric charge in a temporal manner and to uniformly diffuse the electric charge over the substrate surface via the conductive layer thereafter to provide favorable display without afterimages.

The liquid crystal display apparatus according to a first aspect of the present invention is comprised of an array substrate, a counter substrate, and liquid crystal that is interposed and held by a space formed by maintaining the array substrate and the counter substrate at a predetermined interval in a parallel manner, the liquid crystal display apparatus being of in-plane switching in which voltage is applied on a pair of electrodes disposed on the array substrate to generate an electric field substantially parallel with respect to the array substrate surface and in which liquid crystal is driven through in-plane switching of liquid crystal molecules, wherein the array substrate is formed with a conductive film layer on a surface opposite to the surface on which the pair of electrodes are disposed.

In the liquid crystal display apparatus according to a second aspect, it is preferable that the resistance (sheet resistance) of the conductive film layer be not less than 10 $\Omega$ and not more than $1 \times 10^{10}$ $\Omega$, whereby electric charge can be diffused.

In the liquid crystal display apparatus according to a third aspect, it is preferable that the counter substrate be conductive, whereby partial storage of electric charge can be prevented.

In the liquid crystal display apparatus according to a fourth aspect, it is preferable that substantially the whole surface of a first surface of the counter substrate which opposes the array substrate be conductive, whereby electric charge can be reliably diffused.

In the liquid crystal display apparatus according to a fifth aspect, it is preferable that substantially the whole surface of a second surface of the counter substrate on an opposite side with respect to the first surface which opposes the array substrate be conductive, whereby the liquid crystal layer is hardly affected.

In the liquid crystal display apparatus according to a sixth aspect, it is preferable that substantially the whole surface of the first surface of the counter substrate which opposes the array substrate and the second surface of the counter substrate on the opposite side with respect to the first surface be conductive, whereby diffusion of partially residing electric charge can be promoted.

DETAILED DESCRIPTION

Figure 1A:
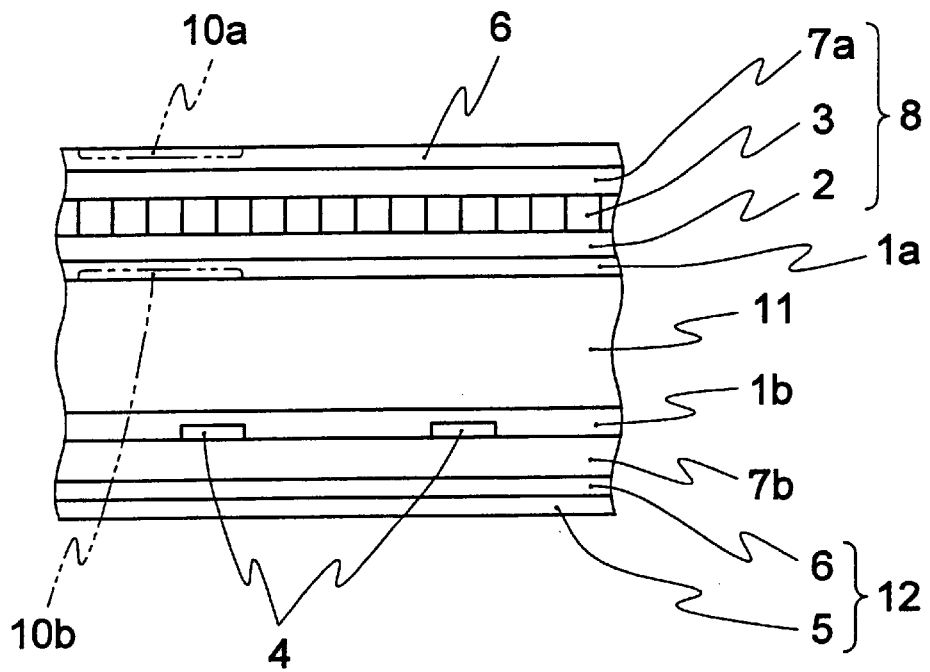
FIGS. 1(a) and 1(b) are sectional views showing a liquid crystal display apparatus of one embodiment of the present invention.

The present invention will now be explained by examples of embodiments thereof and with reference to the accompanying drawings. Display characteristics of embodiments and comparative examples have been summarized in Table 1.

TABLE 1

| | Location of conductive part | material of conductive part | sheet resistance | afterimage |
|---|---|---|---|---|
| EMBODIMENT 1 | electrode substrate: outside counter substrate: inside | electrode substrate: polarizer with ITO counter substrate: alignment layer | 400$\Omega$ 4.3 × (10E + 8)$\Omega$ | no |

TABLE 1-continued

| | Location of conductive part | material of conductive part | sheet resistance | afterimage |
|---|---|---|---|---|
| EMBODIMENT 2 | electrode substrate: outside counter substrate: inside | electrode substrate: polarizer with ITO counter substrate: alignment layer | 300Ω 6.4 × (10E + 7)Ω | no |
| EMBODIMENT 3 | electrode substrate: outside counter substrate: inside | electrode substrate: ITO film counter substrate: color filter | 3.7 kΩ 7.3 × (10E + 8)Ω | no |
| EMBODIMENT 4 | electrode substrate: outside counter substrate: inside | electrode substrate: ITO film counter substrate: ITO film | 3.7 kΩ 2.5 × (10E + 7)Ω | no |
| EMBODIMENT 5 | electrode substrate: outside counter substrate: inside | electrode substrate: polarizer with conductive adhesive counter substrate: alignment layer | 2.3 kΩ 6.3 kΩ | no |
| EMBODIMENT 6 | electrode substrate: outside counter substrate: inside | electrode substrate: polarizer with ITO counter substrate: polarizer with ITO | 300Ω 300Ω | no |
| EMBODIMENT 7 | electrode substrate: outside counter substrate: no | electrode substrate: polarizer with ITO | 2.9 kΩ | no |
| EMBODIMENT 8 | electrode substrate: outside counter substrate: no | electrode substrate: polarizer with ITO | 300Ω | no |
| EMBODIMENT 9 | electrode substrate: outside counter substrate: no | electrode substrate: polarizer with conductive adhesive | 6.5 kΩ | no |
| EMBODIMENT 10 | electrode substrate: outside counter substrate: outside | electrode substrate: polarizer with conductive adhesive counter substrate: polarizer with conductive adhesive | 5.0 kΩ 5.0 kΩ | no |
| EMBODIMENT 11 | electrode substrate: outside counter substrate: both sides | electrode substrate: ITO film counter substrate (inside): alignment counter substrate (outside): ITO film | 5.5 kΩ 3.5 × (10E + 12)Ω 900Ω | no |
| COMPARATIVE | — | — | — | occured |

First, it will be explained of results of studies that have been made for applying conductivity to the array substrate and the counter substrate in the present invention.

It is inevitable that the material used for the conductive film layer (hereinafter simply referred to as "conductive layer") has a sheet resistance of not less than 10 Ω and not more than 1×10$^{10}$ Ω to provide sufficient conductivity in case of applying the same on the surface of the array substrate opposite to the surface formed with the electrodes. It is more preferable that this value be not more than 1 kΩ. In case the sheet resistance is more than 1×10$^{10}$ Ω, the conductivity becomes small, whereby diffusion of electric charge and elimination thereof to outside the substrate can not be sufficiently performed and thus occurrence of afterimages can not be decreased. On the other hand, in case the sheet resistance is less than 10 Ω, the transmittance of light is decreased due to light absorption of the conductive layer so that the sheet resistance needs to be set to be not less than 10 Ω. Various methods can be taken to provide conductivity, such as forming indium tin oxide (hereinafter referred to as "ITO") films, employing polarizers with ITO which are polarizers applied with ITO films, employing polarizers with conductive adhesive, or employing ITO films. While materials for the polarizers with ITO are not especially limited, there are known materials including triacetyl cellulose as a base substrate, and materials can be used as employed for polarizers used in conventional TN liquid crystal display apparatuses. The same applies to polarizers with conductive adhesive.

In case of applying the layer to the first surface (in-opposing) counter the array substrate, it is inevitable that the sheet resistance of the conductive material be of not less than 1×10$^6$ Ω and not more than 1×10$^{13}$ Ω. Further, it is preferable the sheet resistance of the conductive materials is not less than 1×10$^7$ Ω and not more than 1×10$^{12}$ Ω. In case the sheet resistance is less than 1×10$^6$ Ω, the electric charge or capacitance between the comb-like shaped electrodes and the conductive layer increases, and in case this value is more than 1×10$^{13}$ Ω, the conductivity becomes small, whereby diffusion of electric charge and elimination thereof to outside the substrate can not be sufficiently performed and occurrence of afterimages can not be decreased which does not suit the purpose of the present invention. As for the compositional material, it may be used materials as those for alignment layer, color filters, color filter protecting films or ITO films.

As noted, while materials for the conductive alignment films are not especially limited, it may also be employed π conjugated macromolecules, metal oxides or charge-transfer complexes. Examples of such π conjugated macromolecules are polyacetylene, polypyrrole, polythiophene, polythienylene vinylene, polyphenylene vinylene, polyaniline, and derivatives thereof. The present invention is not limited to these unless alternative materials present conductivity and which also apply orientation (alignment) to liquid crystal materials. It is also possible to use these materials in combination instead of using them singly. There are various methods for combining these, for instance, mixing π conjugated macromolecules, metal oxides or charge-transfer complexes to conventional polyimide (alignment layer). Alternatively, ion such as Li$^+$ or Na$^+$ may be injected into polyimide.

Conductive color filters may be manufactured and used by mixing polycyclic aromatic compounds such as anthracene, tetracene or phthalocyanine compounds to conventional color filter coloring layers or by mixing π conjugated macromolecules. The present invention is not limited to these unless alternative materials present conductivity and are capable of representing hues.

Conductive color filter protecting films may be obtained by using conductive materials such as π conjugated macromolecules, metal oxides or charge-transfer complexes or mixing these to acrylic macromolecules. The present invention is not limited to these unless alternative materials present conductivity.

ITO films may be formed through vacuum evaporating method, spattering method, or spin coating method. The film thickness is not required to be uniform over the whole film.

In case the second surface (ex-opposing) of the counter substrate which is opposite to the first surface is conductive, that is, the surface opposite to the array substrate is conductive, it is inevitable that the sheet resistance thereof be of not less than 10 Ω and not more than $1\times10^{10}$ Ω, similar to the conductive layer on the array substrate. It is more preferable that this value be not more than 1 kΩ. The same reason applies for limiting the range for the sheet resistance to these values as that for forming the conductive layer on the array substrate. In case the sheet resistance is more $1\times10^{10}$ Ω, the conductivity becomes small, and diffusion of electric charge as well as elimination thereof to outside the substrate can not by sufficiently performed so that occurrence of afterimages can not be decreased. For applying conductivity, various methods may be taken such as forming ITO films, employing polarizers with ITO, employing polarizers with conductive adhesive, or employing ITO films. While materials for the polarizers with ITO are not especially limited, there are known materials including triacetyl cellulose as a base substrate, and materials can be used as employed for polarizers used in conventional TN liquid crystal display apparatuses. The same applies to polarizers with conductive adhesive.

Further, in case both the first surface and the second surface (in- and ex-opposing) of the counter substrate are conductive, that is, the counter substrate is conductive on both surfaces thereof, similar materials as above described may be used. The conductive layer used for the first surface counter the array substrate needs to have a sheet resistance of not less than $1\times10^6$ Ω and not more than $1\times10^{13}$ Ω, and more preferably, not less than $1\times10^7$ Ω and not more than $1\times10^{12}$ Ω. The conductive layer used for the second layer opposite to the first surface needs to have a sheet resistance of not less than 10 Ω and not more than $1\times10^{10}$ Ω, and more preferably, not more than 1 kΩ. The materials may be similar to those as above described.

Detailed considerations of the inventors have made it evident that by arranging the array substrate as shown in FIG. 1 to be conductive, it has been achieved that no afterimages can be recognized by a person looking at the display even if the surface of the liquid crystal display apparatus is rubbed at the time of performing display. For this purpose, it is required to meet the condition that the sheet resistance of the conductive layer is not more than 10 kΩ.

Figure 1B:
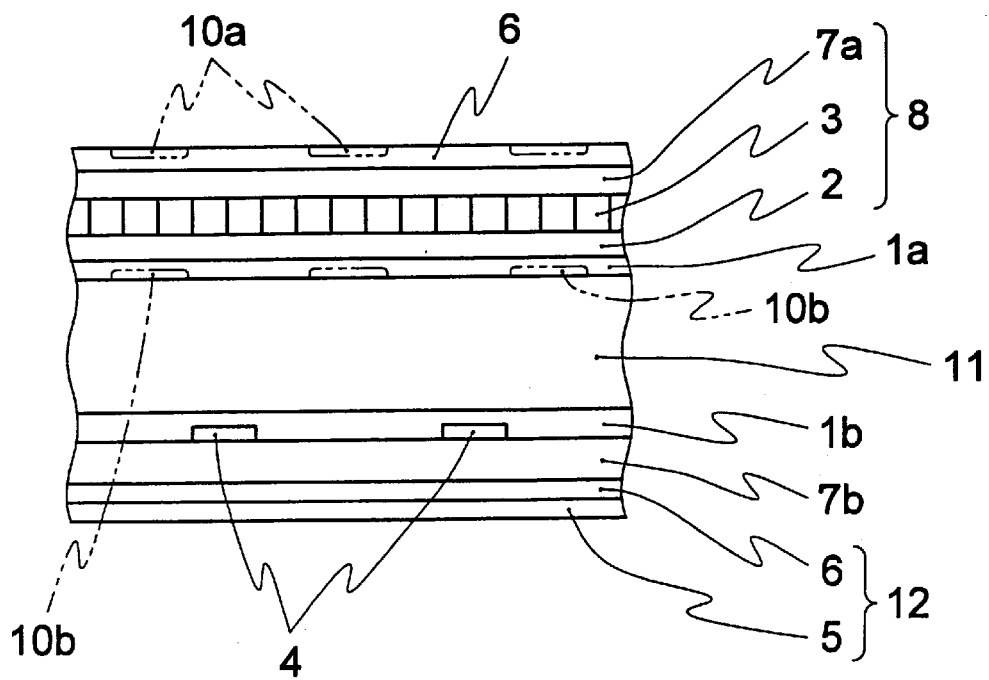
Figure 2A:
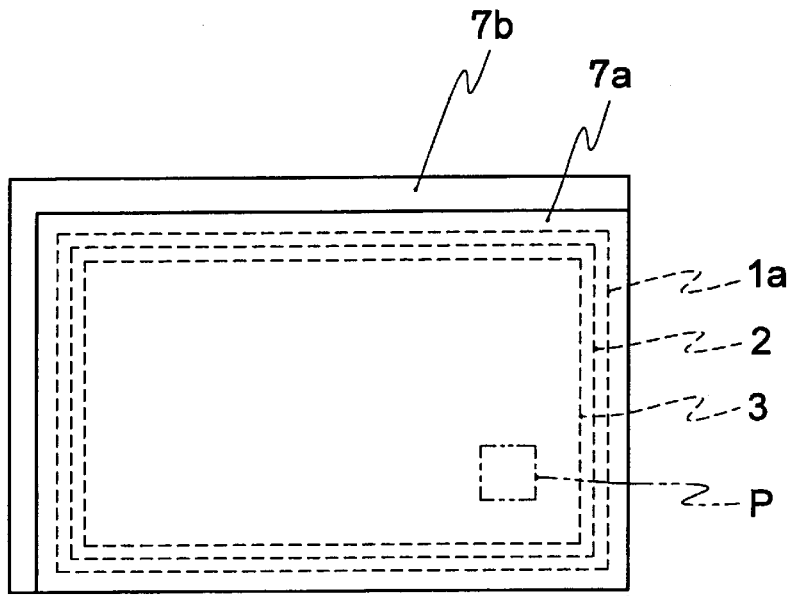
FIGS. 2(a) and 2(b) are explanatory views showing a liquid crystal display apparatus of one embodiment of the present invention.
Figure 2B:
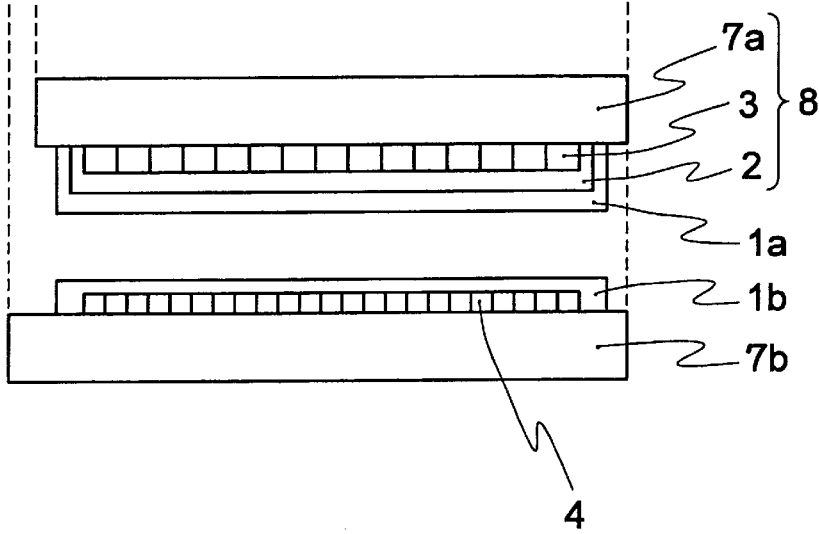
Figure 3A:
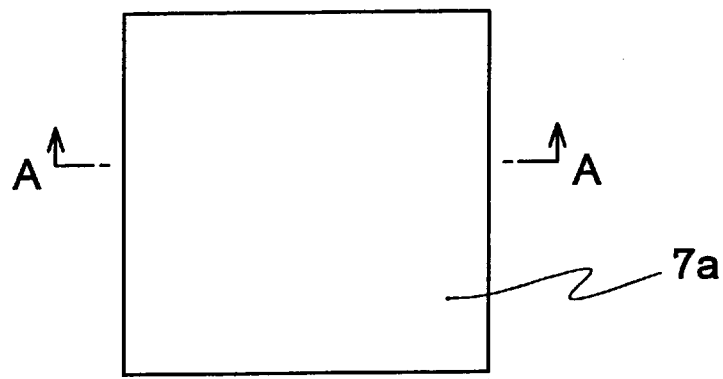
FIGS. 3(a) and 3(b) are partially enlarged views showing a liquid crystal display apparatus of one embodiment of the present invention.
Figure 3B:
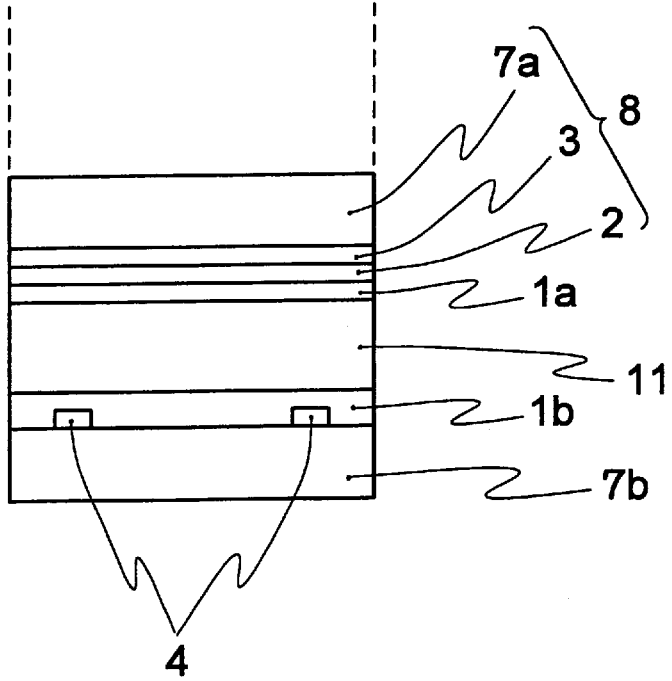

Next, the arrangement of the liquid crystal display apparatus according to the present invention will be explained. A partial, sectional and explanatory view of the liquid crystal display apparatus according to the present invention is shown in FIG. 1(a) and FIG. 1(b), a planar explanatory view thereof in FIG. 2(a), a side explanatory view thereof in FIG. 2(b), and a partially enlarged explanatory view of a portion P is shown in FIGS. 3(a) and 3(b). FIG. 3(a) is a plan explanatory view of region P as shown in FIGS. 2(a) and 2(b), and FIG. 3(b) is a sectional explanatory view along line A—A of region P. In FIGS. 2(a), 2(b), 3(a) and 3(b), polarizers that are respectively provided at the outer side of the array substrate and at the outer side of the counter substrate have been omitted. FIGS. 1(a) and 1(b) are sectional explanatory views of an arrangement in which the array substrate comprises a conductive layer on a surface opposite to the surface formed with the electrodes, and in which the counter substrate is conductive on the side facing the array substrate. In these drawings, numerals 1a and 1b denote alignment layers, numeral 2 color film protecting layer, 3 a color filter, 4 comb-like shape electrodes, numeral 5 an ITO film, numeral 6 a polarizer, numerals 7a and 7b glass substrates, numeral 8 a counter substrate, numeral 9 a conductive film formed of conductive adhesive, numerals 10a and 10b regions electrified with electric charge, numeral 11 a liquid crystal layer, numeral 12 a polarizer with ITO, and numeral 13 a polarizer with conductive adhesive.

In the drawings, it has been schematically shown of a case in which each of the filters of the color filter 3 are disposed as dots in a form of arrays. Further, FIG. 1(a) shows a condition in which electric charge is partially stored on the substrate surface, and FIG. 1(b) a condition in which electric charge is uniformly distributed over the substrate surface, respectively.

In case the array substrate comprises a conductive layer extending substantially over the whole surface opposite to the surface formed with electrodes, and the counter substrate is conductive substantially over the whole surface on the side facing the array substrate, application of electric charge from the exterior through, for instance, static electricity, causes generation of a portion at which electric charge is partially stored as shown in FIG. 1(a), and electric charge is not stored at any other portion. Differences in aligning angles of liquid crystal molecules are generated at portions at which electric charge is being stored and at portions at which it is not, which is recognized as an afterimage. However, in case the array substrate and the counter substrate are conductive, electric charge is diffused and uniformly distributed over the substrate surface through the conductive layers so that afterimages are eliminated and favorable display can be achieved. In this context, "substantially the whole surface" indicates all regions on the substrate at which electric charge may be stored (which also applies hereinafter).

Figure 4:
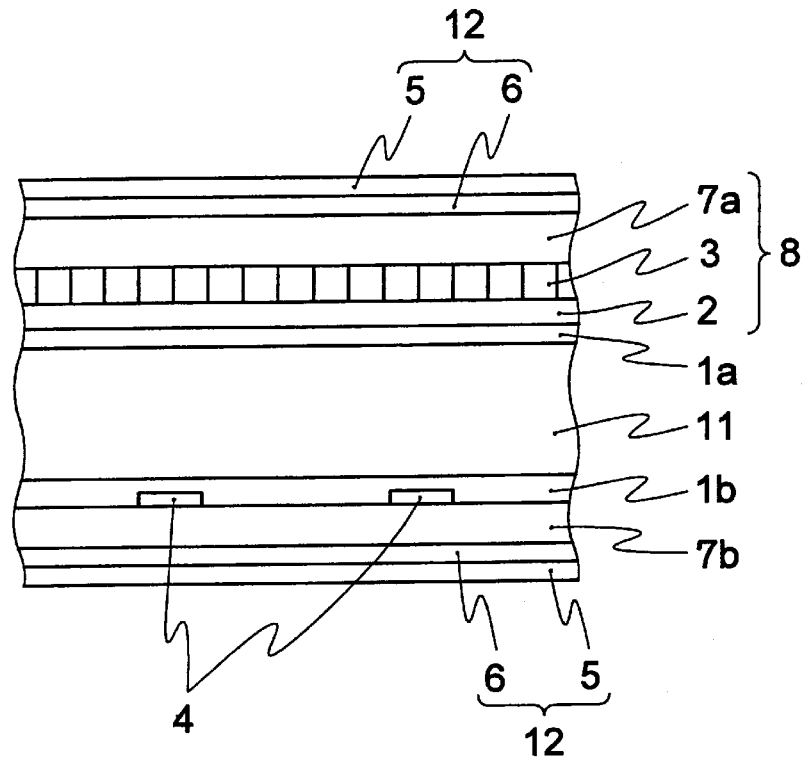
FIG. 4 is a sectional view showing a liquid crystal display apparatus of another embodiment of the present invention.
Figure 5:
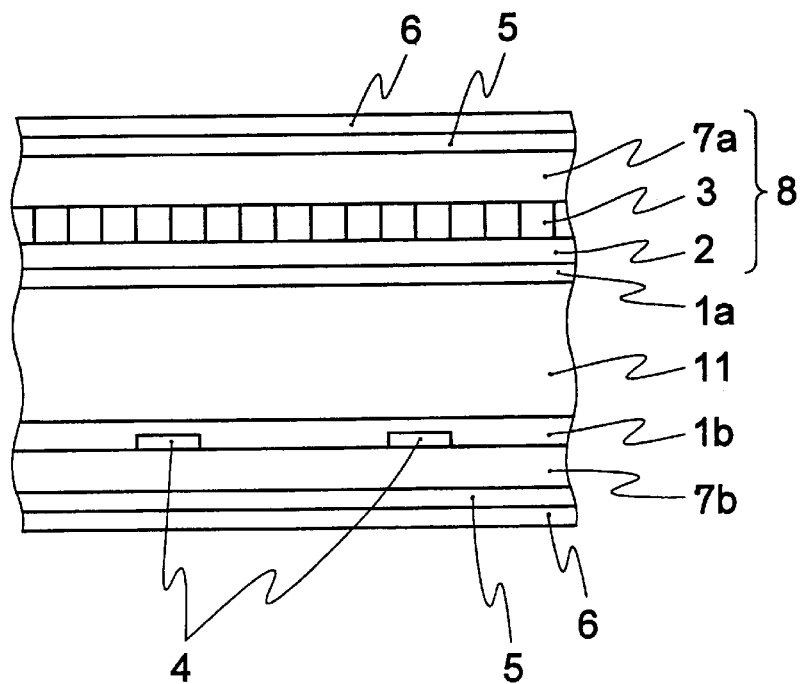
FIG. 5 is a sectional view showing a liquid crystal display apparatus of still another embodiment of the present invention.
Figure 6:
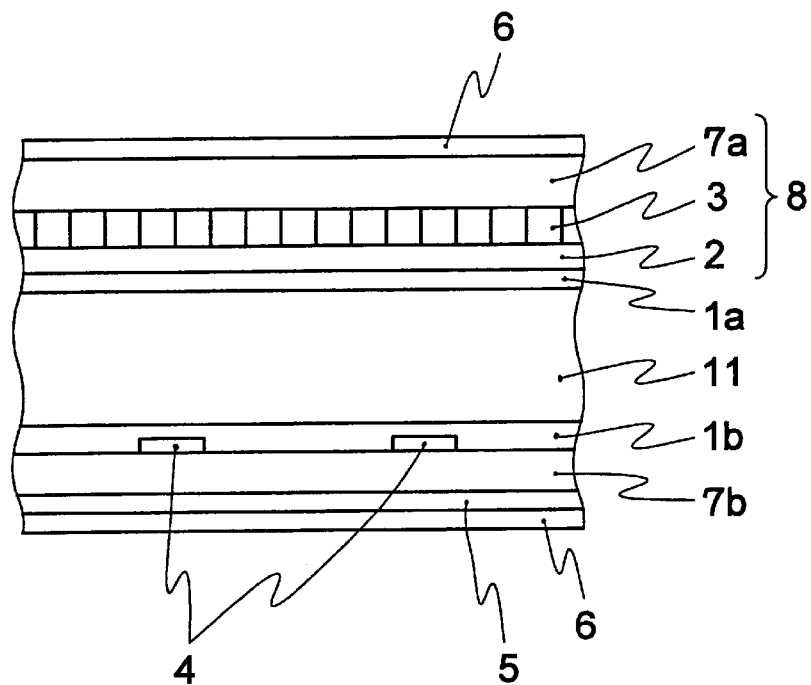
FIG. 6 is a sectional view showing a liquid crystal display apparatus of still another embodiment of the present invention.

In all of the arrangements as that as shown in FIG. 4 wherein the conductive layer extends over substantially the whole surface of the array substrate and the first surface of the counter substrate (in-opposing) which opposes the array substrate is conductive over substantially the whole surface, that as shown in FIG. 5 wherein the conductive layer extends over substantially the whole surface of the array substrate and both the first surface and the second surface of the counter substrate (in- and ex-opposing) are conductive over substantially the whole surfaces, and that as shown in FIG. 6 wherein a conductive layer is provided over the array substrate surface, afterimages can be eliminated due to the same effects, and favorable display can be achieved. Alternatively, afterimages can be similarly eliminated and favorable display can be achieved by providing an arrangement for dropping the conductive layer to the ground, that is, for grounding them.

While materials for the substrates as employed in the present invention are not limited, it may be employed materials such as normal glass or quartz as employed in conventional liquid crystal display apparatuses. While there are no limitations for materials used for the electrodes of the present invention, metal or metal oxide films of aluminum or chrome may be suitably employed.

EMBODIMENT 1

Figure 14:
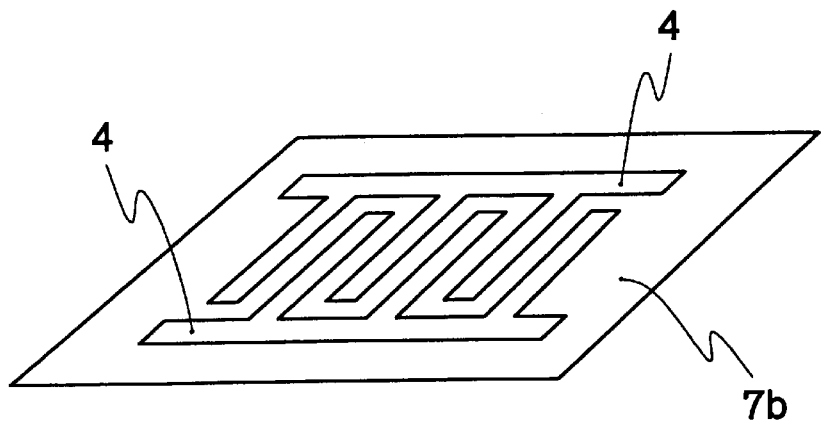
FIG. 14 is an explanatory view showing a pattern of a comb-like shaped electrode.

FIGS. 2(a) and 2(b) are each overall planar explanatory view and sectional explanatory view of the liquid crystal display apparatus according to Embodiment 1 of the present invention, and an explanatory view of a partially enlarged section is shown in FIG. 1(b). In this embodiment, materials of the alignment layer were used for forming the conductive films, and a polarizer with ITO was adhered to the electrodes substrate (array substrate, hereinafter referred to as "electrodes substrate"). The counter substrate 8 was arranged in that color filters of three colors, that is, green, red and blue, were formed on the glass substrate, and a color filter protecting layer was applied thereon. Metal electrodes were patterned on the glass substrate 7b to assume a form as shown in FIG. 14. FIG. 14 is a cross explanatory view of the comb-like shaped electrode pattern, and reference numerals as shown therein are identical with those of FIGS. 1(a), 1(b), 2(a), 3(a) and 3(b). In the space between the two substrates, there was formed a liquid crystal layer having a thickness of 5 μm and made of liquid crystal composition.

Processes for manufacturing this liquid crystal display apparatus will now be explained. Chrome was formed over the glass substrate 7b to assume a film thickness of 1,000 Å through spattering method, and a pair of comb-like shaped electrodes 4 were formed through patterning by using a positive photosensitive resist. The width of the comb-like shaped electrodes was set to be 5 μm and the interval between the electrodes was set to be 5 μm as well. Over this glass substrate, an alignment layer 1b of polyimide (AL1034, manufactured by Japan Synthetic Rubber Co., Ltd.) was formed to assume a thickness of 800 Å through spin coating method, and was baked (180° C., 1 hour 30 minutes). Polyacethylene which is a material for alignment layers was formed over the counter substrate 8 to assume a thickness of 800 Å. The sheet resistance of this material of alignment layer was $4.3 \times 10^8$ Ω. Rubbing treatments were performed for the electrodes substrate formed with the comb-like shaped electrodes and for this counter substrate. The rubbing direction for the electrodes substrate was a direction shifted by 0 to 45 degrees with respect to a direction between the electrodes, and that for the counter substrate to be anti-parallel to that of the electrodes substrate. Employing an epoxy resin adhesive, a sealing agent was disposed on the electrodes substrate in a form of a ring, and heat treatment (100° C., 10 minutes) was performed. Spacers (manufactured by Sekisui Fine Chemicals) of grain sizes of 5 μm were dispersed over the counter substrate 8 at a rate of 100 grains/mm². The two substrates were overlapped such that their rubbing direction were anti-parallel to each other, the sealing agent was cured by thermocompression bonding, and liquid crystal composition ZLI-2293 (manufactured by Melk Japan) was injected into the space between both substrates through vacuum injection method. The injecting opening was sealed through an UV curing resin, and isotropic treatment was performed (110° C., 10 minutes). The polarizers were respectively formed by adhering an ordinary polarizer (manufactured by Sumitomo Chemical Co., Ltd.) on the outermost side of the counter substrate, and by adhering a polarizer with ITO (manufactured by Sumitomo Chemical Co., Ltd.) on the outermost side of the electrodes substrate. The sheet resistance of the ITO was 300 Ω. The adhering direction of the polarizers were respectively set such that the absorbing axial direction for the polarizer at the light incident side was identical to the aligning direction (rubbing direction) of the liquid crystal molecules, and the absorbing axial direction for the polarizer at the light outgoing side was right-angled with respect to those of other polarizers.

The liquid crystal display apparatus manufactured in the above described manner is applied with an alignment layer having a sheet resistance of $4.3 \times 10^8$ Ω on the counter substrate thereof, and a polarizer with ITO having a sheet resistance of 300 Ω is adhered to the side of the electrodes substrate. The manufacturing processes were not different from conventional processes for manufacturing liquid crystal display apparatuses. In this manner, it was possible to achieve favorable display without afterimages in the liquid crystal display apparatus according to the present invention.

EMBODIMENT 2

Figure 7:
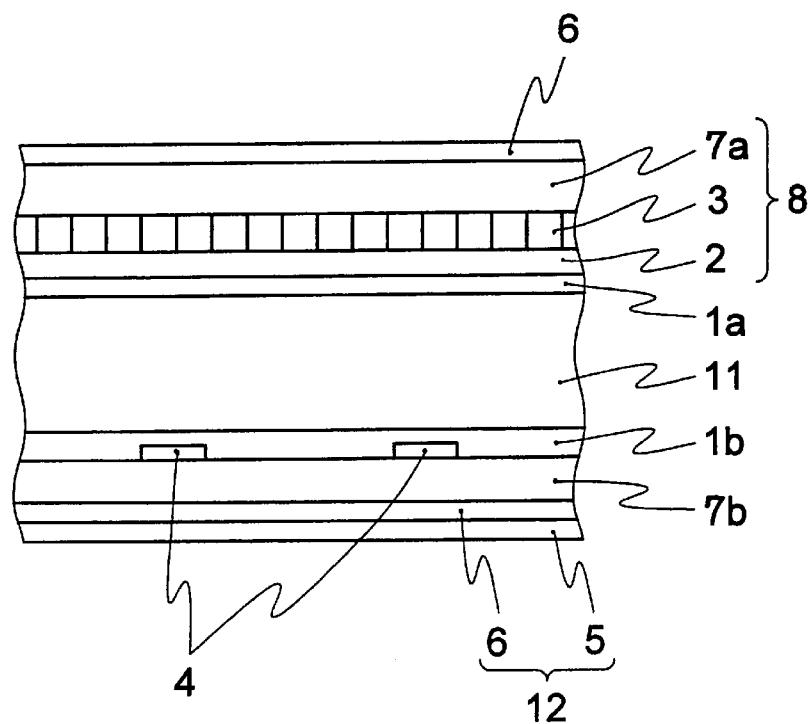
FIG. 7 is a sectional view showing a liquid crystal display apparatus of still another embodiment of the present invention.

The overall planar explanatory view of the liquid crystal display apparatus according to Embodiment 2 of the present invention is identical to that of FIG. 2(a), and a sectional enlarged explanatory view of a part thereof is shown in FIG. 7. The reference numerals in FIG. 7 are identical to those of FIGS. 1(a), 1(b), 2(a), 2(b), 3(a), 3(b) and 4 to 6 (and this also applies to all drawings succeeding FIG. 7). In this embodiment, an insulating alignment layer was employed in the case of Embodiment 1, a conductive layer and a color filter were used, and a polarizer with ITO was adhered on the side of the electrodes substrate. As shown in FIG. 7, a conductive color filter 3 was formed on the counter substrate 8 and a color film protecting layer 2 was applied thereon. Electrodes are patterned on the glass substrate 7b similarly to the case of Embodiment 1.

Manufacturing processes of this liquid crystal display apparatus will now be explained. First, a pair of comb-like shaped electrodes 4 were formed on the glass substrate 7b by methods similar to those of Embodiment 1. The width of the comb-like shaped electrodes was set to be 5 μm and the interval between the electrodes was set to be 5 μm as well. Over this glass substrate, an alignment layer 1b of polyimide (A1 1034, manufactured by Japan Synthetic Rubber Co., Ltd.) was formed to assume a thickness of 800 Å. The counter substrate comprised a conductive color filter 3 on the glass substrate 7b, and a color filter protecting layer 2 was applied thereon. The color filter 3 was a mixture of coloring member and anthracene, and the sheet resistance thereof was $6.4 \times 10^7$ Ω. Polyimide AL1034 was applied over this substrate to assume a thickness of 800 Å. Rubbing treatments were performed for both of the electrodes. The rubbing directions were identical to those of Embodiment 1. Then, both substrates were overlapped such that the cell gap was 5 μm, and such that the rubbing directions were anti-parallel to each other. Liquid crystal composition ZLI-2293 was injected, and the injection inlet was sealed. The polarizers were respectively formed by adhering an ordinary polarizer (manufactured by Sumitomo Chemical Co., Ltd.) on the side of the counter substrate, and by adhering a polarizer with ITO (manufactured by Sumitomo Chemical Co., Ltd.) on the side of the electrodes substrate. The sheet resistance of the ITO was 300 Ω. The adhering direction of the polarizers were set to be identical to those of Embodiment 1.

The liquid crystal display apparatus manufactured in the above described manner comprised a counter substrate having a color filter 3 of a sheet resistance of $6.4 \times 10^7$ Ω, and an electrodes substrate having a polarizer with ITO 12 of a sheet resistance of 300 Ω. The manufacturing processes were not different from conventional processes for manufacturing liquid crystal display apparatuses. In this manner, it was possible to achieve favorable display without afterimages similar to Embodiment 1 in the liquid crystal display apparatus according to the present invention.

EMBODIMENT 3

Figure 8:
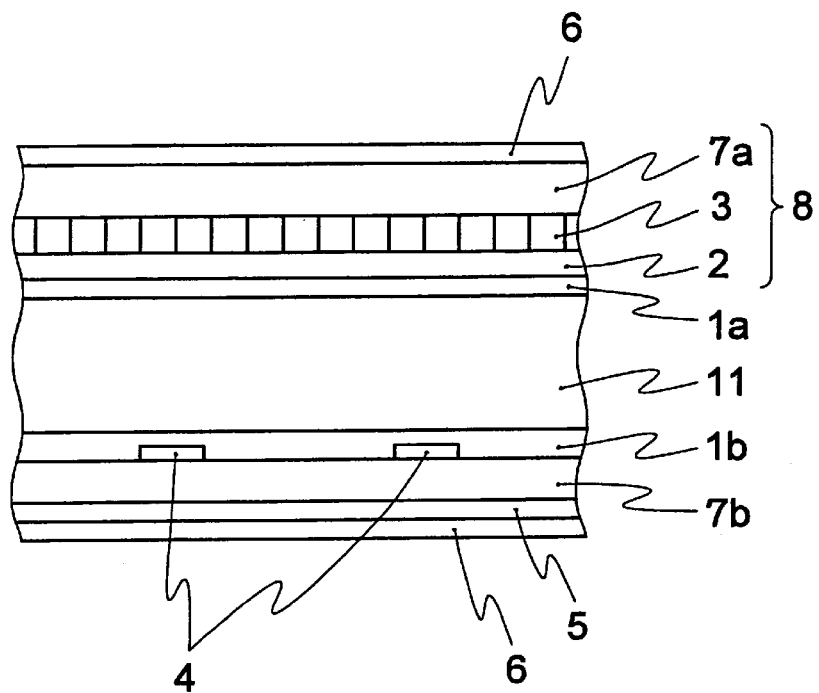
FIG. 8 is a sectional view showing a liquid crystal display apparatus of still another embodiment of the present invention.

The overall planar explanatory view of the liquid crystal display apparatus according to Embodiment 3 of the present invention is identical to that of FIG. 2(a), and a sectional enlarged explanatory view of a part thereof is shown in FIG. 8. In this embodiment, it was employed an insulating alignment layer, a color filter protecting layer was employed as the conductive layer, and an ITO film 5 was formed on the outer side of the electrodes substrate. As shown in FIG. 8, a conductive color filter protecting layer 2 was applied on the color filter of the counter substrate 8. Electrodes were patterned on the glass substrate 7b similarly to Embodiment 1.

Manufacturing processes of this liquid crystal display device will now be explained. First, an ITO film 2 was formed on the glass substrate 7b. The sheet resistance of the ITO film 5 was 3.7 k$\Omega$. Then, a pair of comb-like shaped electrodes 4 was formed by methods similar to that of Embodiment 1 on a side opposite to the surface with the ITO film. The width of the comb-like shaped electrodes was set to be 5 $\mu$m and the interval between the electrodes was set to be 5 $\mu$m as well. Over this, an alignment layer 1b of polyimide (AL1034, manufactured by Japan Synthetic Rubber Co., Ltd.) was formed to assume a thickness of 800 Å. The counter substrate 8 comprised a conductive color filter protecting layer 2. The color filter protecting layer 2 was a mixture of acryl and polypyrrole, and the sheet resistance thereof was 7.3×10$^8$ $\Omega$. Over this substrate, an alignment layer 1a of polyimide (AL1034, manufactured by Japan Synthetic Rubber Co., Ltd.) was formed to assume a thickness of 800 Å. The rubbing directions were identical to those of Embodiment 1. Then, both substrates were overlapped such that the cell gap was 5 $\mu$m, and such that the rubbing directions were anti-parallel to each other. Liquid crystal composition ZLI-2293 was injected, the injection inlet was sealed, and the polarizers were adhered. The adhering direction of the polarizers were identical with those of Embodiment 1.

In the liquid crystal display apparatus manufactured in the above described manner, the sheet resistance of the color filter protecting layer 2 was 7.3×10$^8$ $\Omega$, and an ITO film having a sheet resistance of 3.7 k$\Omega$ was formed. The manufacturing processes were not different from conventional processes for manufacturing liquid crystal display apparatuses. In this manner, it was possible to achieve favorable display without afterimages similar to Embodiment 1 in the liquid crystal display apparatus according to the present invention.

EMBODIMENT 4

Figure 9:
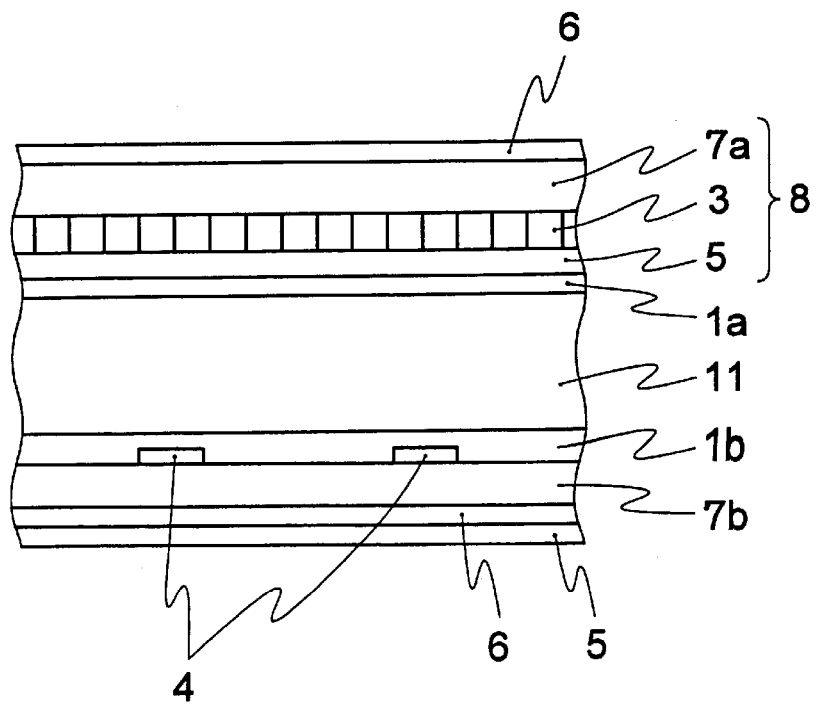
FIG. 9 is a sectional view showing a liquid crystal display apparatus of still another embodiment of the present invention.

The overall planar explanatory view of the liquid crystal display apparatus according to Embodiment 4 of the present invention is identical to that of FIG. 2(a), and a sectional enlarged explanatory view of a part thereof is shown in FIG. 9. In this embodiment, it was employed an insulating alignment layer in the case of Embodiment 1, and an ITO film 5 was formed on the color filter 3 as a conductive layer, and an ITO film 5 was further formed on the outer side of the electrodes substrate. As shown in FIG. 9, an ITO film 5 was formed on the color filter 3 of the counter substrate 8. Electrodes were patterned on the glass substrate 7b similarly to Embodiment 1.

Manufacturing processes of this liquid crystal display device will now be explained. ITO film 5 and comb-like shaped electrodes 4 were formed through methods similar to those of Embodiment 3. The sheet resistance of this ITO film on the electrodes substrate was 3.7 k$\Omega$. The width of the comb-like shaped electrodes was set to be 5 $\mu$m and the interval between the electrodes was set to be 5 $\mu$m as well. Over this, an alignment layer 1b of polyimide (AL1034, manufactured by Japan Synthetic Rubber Co., Ltd.) was formed to assume a thickness of 800 Å. Then, an ITO film 5 was formed on the counter substrate 8 through spattering method to assume a thickness of 100 to 150 Å. The sheet resistance of this ITO film 5 on the counter substrate was 2.5×10$^7$ $\Omega$. Over this film, polyimide 1b (AL1034, manufactured by Japan Synthetic Rubber Co., Ltd.) was formed to assume a thickness of 800 Å. Rubbing treatments were performed for the two substrates. The rubbing directions were identical to those of Embodiment 1. Then, both substrates were overlapped such that the cell gap was 5 $\mu$m, and such that the rubbing directions were anti-parallel to each other. Liquid crystal composition ZLI-2293 was injected, the injection inlet was sealed, and the polarizers 6 were adhered. The adhering direction of the polarizers 6 were identical with those of Embodiment 1.

In the liquid crystal display apparatus manufactured in the above described manner, there was formed an ITO film having a sheet resistance of 2.5×10$^7$ $\Omega$ on the color filter of the counter substrate, and an ITO film having a sheet resistance of 3.7 k$\Omega$ was formed on the outer side of the electrodes substrate. The manufacturing processes were not different from conventional processes for manufacturing liquid crystal display apparatuses. In this manner, it was possible to achieve favorable display without afterimages similar to Embodiment 1 in the liquid crystal display apparatus according to the present invention.

EMBODIMENT 5

Figure 10:
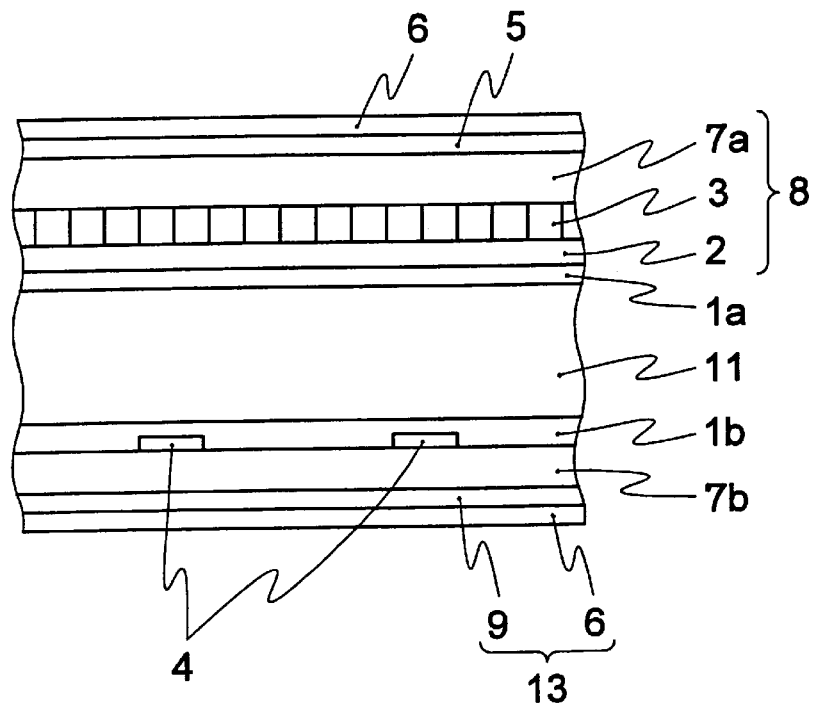
FIG. 10 is a sectional view showing a liquid crystal display apparatus of still another embodiment of the present invention.

The overall planar explanatory view of the liquid crystal display apparatus according to Embodiment 5 of the present invention is identical to that of FIG. 2(a), and a sectional enlarged explanatory view of a part thereof is shown in FIG. 10. In this embodiment, it was employed an insulating alignment layer in the case of Embodiment 1, and an ITO film 5 was formed on the outer side of the counter substrate as a conductive layer, and a polarizer with conductive adhesive 13 was adhered to the electrodes substrate. The counter substrate 8 was a counter substrate similar to that of Embodiment 1, and was formed with an ITO film 5 on the outer side of the substrate. Electrodes were patterned on the glass substrate 7b similarly to Embodiment 1.

Manufacturing processes of this liquid crystal display device will now be explained. Comb-like shaped electrodes 4 were formed on the glass substrate 7b through methods similar to those of Embodiment 1. The width of the comb-like shaped electrodes was set to be 5 $\mu$m and the interval between the electrodes was set to be 5 $\mu$m as well. Over this, an alignment layer 1b of polyimide (AL1034, manufactured by Japan Synthetic Rubber Co., Ltd.) was formed to assume a thickness of 800 Å. The counter substrate 8 comprised an ITO film 5 on a surface opposite to the surface on which the color filter was formed. The sheet resistance of this ITO film was 6.3 k$\Omega$. Over this substrate, an alignment layer 1a of polyimide (AL1034, manufactured by Japan Synthetic Rubber Co., Ltd.) was formed to assume a thickness of 800 Å. The rubbing directions were identical to those of Embodiment 1. Then, both substrates were overlapped such that the cell gap was 5 $\mu$m, and such that the rubbing directions were anti-parallel to each other. Liquid crystal composition ZLI-2293 was injected and the injection inlet was sealed. The polarizer with conductive adhesive 13 was adhered to the electrodes substrate. The sheet resistance of the adhesive was 2.3 k$\Omega$. The adhering directions of the polarizers were identical with those of Embodiment 1.

In the liquid crystal display apparatus manufactured in the above described manner, there was formed an ITO film having a sheet resistance of 3.7 k$\Omega$ on the outer side of the counter substrate, and a polarizer with conductive adhesive having a sheet resistance of 2.3 k$\Omega$ was adhered to the electrodes substrate. The manufacturing processes were not different from conventional processes for manufacturing liquid crystal display apparatuses. In this manner, it was possible to achieve favorable display without afterimages similar to Embodiment 1 in the liquid crystal display apparatus according to the present invention.

EMBODIMENT 6

The overall planar explanatory view of the liquid crystal display apparatus according to Embodiment 6 of the present invention is identical to that of FIG. 2(a), and a sectional enlarged explanatory view of a part thereof is shown in FIG. 4. In this embodiment, it was employed an insulating alignment layer in the case of Embodiment 1, and conductivity was provided to the substrate surface by adhering polarizers with ITO to the counter substrate and the electrodes substrate. The counter substrate 8 was a counter substrate similar to that of Embodiment 5, and electrodes were patterned on the glass substrate 7b similarly to Embodiment 1.

Manufacturing processes of this liquid crystal display device will now be explained. The electrodes substrate was manufactured by methods similarly to those of Embodiment 1. The counter substrate 8 was arranged to be identical with that of Embodiment 1. For the alignment layer made of polyimide (AL1034, manufactured by Japan Synthetic Rubber Co., Ltd.) was employed. The rubbing directions were identical to those of Embodiment 1. Then, both substrates were overlapped such that the cell gap was 5 $\mu$m, and such that the rubbing directions were anti-parallel to each other. Liquid crystal composition ZLI-2293 was injected to obtain the liquid crystal display apparatus. The polarizer was a polarizer with ITO 12 (manufactured by Sumitomo Chemical Co., Ltd.). The sheet resistance of the ITO film 5 of the polarizer was 300 $\Omega$. The adhering directions of the polarizers were identical with those of Embodiment 1.

In the liquid crystal display apparatus manufactured in the above described manner, it was employed a polarizer with ITO 12, and the sheet resistance of the ITO film is 300 $\Omega$. The manufacturing processes are not different from conventional processes for manufacturing liquid crystal display apparatuses. In this manner, it was possible to achieve favorable display without afterimages similar to Embodiment 1 in the liquid crystal display apparatus according to the present invention.

EMBODIMENT 7

The overall planar explanatory view of the liquid crystal display apparatus according to Embodiment 7 of the present invention is identical to that of FIG. 2(a), and a sectional enlarged explanatory view of a part thereof is shown in FIG. 6. In this embodiment, it was employed an insulating alignment layer in the case of Embodiment 1, and an ITO film was formed on the outer side of the electrodes substrate as a conductive layer. The counter substrate 8 was a counter substrate similar to that of Embodiment 5, and electrodes are patterned on the glass substrate 7b similarly to Embodiment 1.

Manufacturing processes of this liquid crystal display device will now be explained. The electrodes substrate was similarly to that of Embodiment 3, and comprised an ITO film 5 on a surface opposite to the electrodes surface. The sheet resistance of the ITO film was 2.9 k$\Omega$. The counter substrate 8 was arranged to be identical with that of Embodiment 1. For the alignment layer made of (AL1034, manufactured by Japan Synthetic Rubber Co., Ltd.) was employed. The rubbing directions were identical to those of Embodiment 1. Then, both substrates were overlapped such that the cell gap was 5 $\mu$m, and such that the rubbing directions were anti-parallel to each other. Liquid crystal composition ZLI-2293 was injected to obtain the liquid crystal display apparatus. The polarizer 6 was identical to that of Embodiment 3. The adhering directions of the polarizers were identical with those of Embodiment 1.

In the liquid crystal display apparatus manufactured in the above described manner, an ITO film having a sheet resistance of 2.9 k$\Omega$ was formed on the outer side of the electrodes substrate. The manufacturing processes were not different from conventional processes for manufacturing liquid crystal display apparatuses. In this manner, it was possible to achieve favorable display without afterimages similar to Embodiment 1 in the liquid crystal display apparatus according to the present invention.

EMBODIMENT 8

Figure 11:
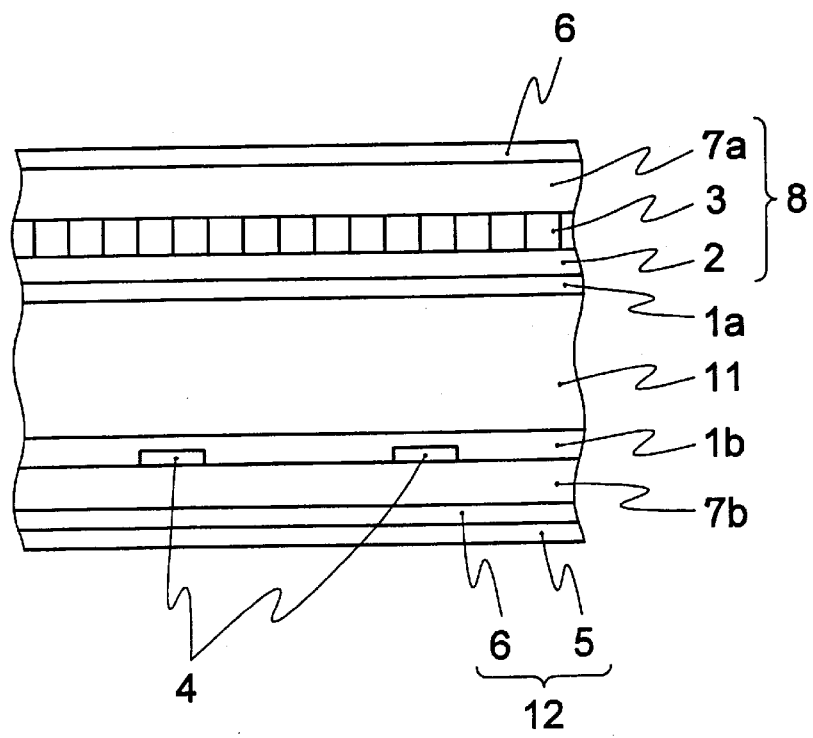
FIG. 11 is a sectional view showing a liquid crystal display apparatus of still another embodiment of the present invention.

The overall planar explanatory view of the liquid crystal display apparatus according to Embodiment 8 of the present invention is identical to that of FIG. 2(a), and a sectional enlarged explanatory view of a part thereof is shown in FIG. 11. In this embodiment, it was employed an insulating alignment layer in the case of Embodiment 1, and a polarizer with ITO 12 was formed on the outer side of the electrodes substrate as a conductive layer. The counter substrate 8 was a counter substrate similar to that of Embodiment 5, and electrodes were patterned on the glass substrate 7b similarly to Embodiment 1.

Manufacturing processes of this liquid crystal display device will now be explained. A substrate with comb-like shaped electrodes was manufactured similarly to that of Embodiment 1. The counter substrate 8 was arranged to be identical with that of Embodiment 1. For the alignment layer made of polyimide (AL1034, manufactured by Japan Synthetic Rubber Co., Ltd.) was employed. The rubbing directions were identical to those of Embodiment 1. Then, both substrates were overlapped such that the cell gap was 5 $\mu$m, and such that the rubbing directions were anti-parallel to each other. Liquid crystal composition ZLI-2293 was injected to obtain the liquid crystal display apparatus. As for the polarizer, a polarizer with ITO 12 was adhered on the electrodes substrate. The sheet resistance of the ITO film of the polarizer was 300 $\Omega$. The adhering directions of the polarizers were identical with those of Embodiment 1.

In the liquid crystal display apparatus manufactured in the above described manner, a polarizer with an ITO film having a sheet resistance of 300 $\Omega$ was adhered to the electrodes substrate. The manufacturing processes were not different from conventional processes for manufacturing liquid crystal display apparatuses. In this manner, it was possible to achieve favorable display without afterimages similar to Embodiment 1 in the liquid crystal display apparatus according to the present invention.

EMBODIMENT 9

Figure 12:
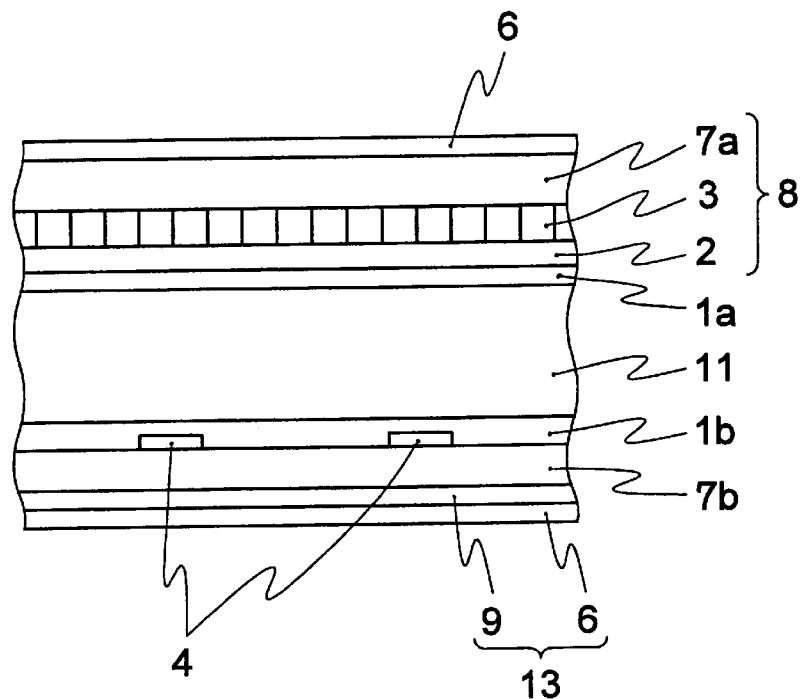
FIG. 12 is a sectional view showing a liquid crystal display apparatus of still another embodiment of the present invention.

The overall planar explanatory view of the liquid crystal display apparatus according to Embodiment 9 of the present invention is identical to that of FIG. 2(a), and a sectional enlarged explanatory view of a part thereof is shown in FIG. 12. In this embodiment, it was employed an insulating alignment layer in the case of Embodiment 1, and a polarizer with conductive adhesive 13 which is a polarizer applied with conductive adhesive was adhered to the side of the electrodes substrate as a conductive layer. The counter substrate 8 was a counter substrate similar to that of Embodiment 5, and electrodes were patterned on the glass substrate 7b similarly to Embodiment 1.

Manufacturing processes of this liquid crystal display device will now be explained. The electrodes substrate was manufactured to be similar to that of Embodiment 1. The counter substrate 8 was arranged to be identical with that of Embodiment 1. For the alignment layer, polyimide (AL1034, manufactured by Japan Synthetic Rubber Co., Ltd.) was employed. The rubbing directions were identical to those of Embodiment 1. Then, both substrates were overlapped such that the cell gap was 5 μm, and such that the rubbing directions were anti-parallel to each other. Liquid crystal composition ZLI-2293 was injected to obtain the liquid crystal display apparatus. As for the polarizer, a polarizer with conductive adhesive 13 was adhered to the electrodes substrate. The sheet resistance of this adhesive was 6.5 kΩ. The adhering directions of the polarizers were identical with those of Embodiment 1.

In the liquid crystal display apparatus manufactured in the above described manner, a polarizer with conductive adhesive having a sheet resistance of 6.5 kΩ was adhered to the electrodes substrate. The manufacturing processes were not different from conventional processes for manufacturing liquid crystal display apparatuses. In this manner, it was possible to achieve favorable display without afterimages similar to Embodiment 1 in the liquid crystal display apparatus according to the present invention.

EMBODIMENT 10

Figure 13:
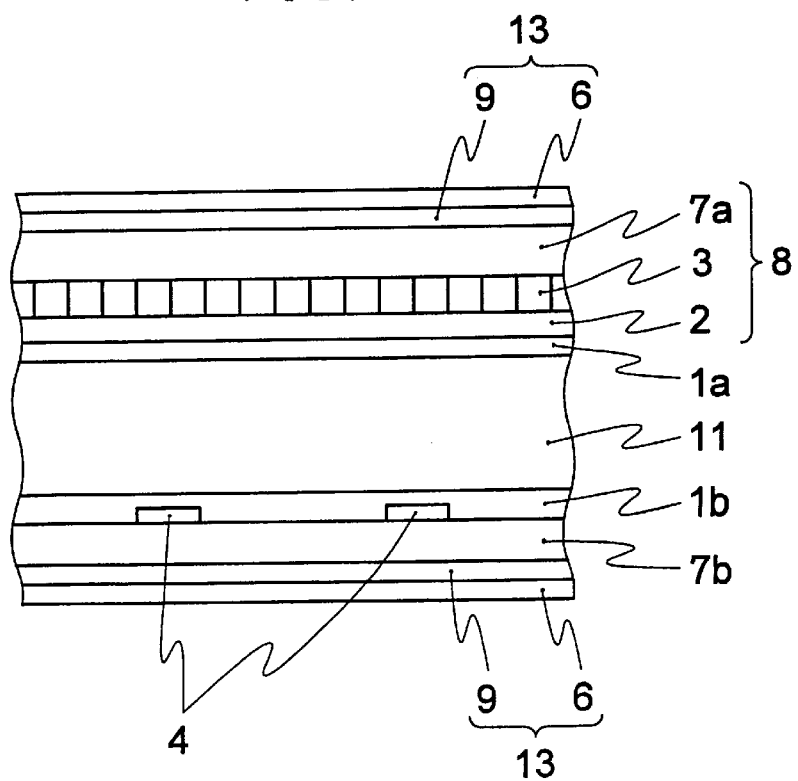
FIG. 13 is a sectional view showing a liquid crystal display apparatus of still another embodiment of the present invention.

The overall planar explanatory view of the liquid crystal display apparatus according to Embodiment 10 of the present invention is identical to that of FIG. 2(*a*), and a sectional enlarged explanatory view of a part thereof is shown in FIG. 13. In this embodiment, it was employed an insulating alignment layer in the case of Embodiment 1, and a polarizer with conductive layer 13 was adhered to the electrodes substrate and the counter substrate as conductive layers. The counter substrate 8 was a counter substrate similar to that of Embodiment 5, and electrodes were similarly patterned on the glass substrate 7*b* to Embodiment 1.

Manufacturing processes of this liquid crystal display device will now be explained. The electrodes substrate was manufactured similarly to that of Embodiment 1. The counter substrate 8 was arranged to be identical with that of Embodiment 1. For the alignment layer, polyimide (AL1034, manufactured by Japan Synthetic Rubber Co., Ltd.) was employed. The rubbing directions were identical to those of Embodiment 1. Then, both substrates were overlapped such that the cell gap was 5 μm, and such that the rubbing directions were anti-parallel to each other. Liquid crystal composition ZLI-2293 was injected to obtain the liquid crystal display apparatus. The polarizer was a polarizer with conductive adhesive 13. The sheet resistance of this adhesive was 5.0 kΩ. The adhering directions of the polarizers were identical with those of Embodiment 1.

In the liquid crystal display apparatus manufactured in the above described manner, a polarizer with conductive adhesive 13 having a sheet resistance of 5.0 kΩ was adhered to the electrodes substrate. The manufacturing processes were not different from conventional processes for manufacturing liquid crystal display apparatuses. In this manner, it was possible to achieve favorable display without afterimages similar to Embodiment 1 in the liquid crystal display apparatus according to the present invention.

EMBODIMENT 11

The overall planar explanatory view of the liquid crystal display apparatus according to Embodiment 11 of the present invention is identical to that of FIG. 2(*a*), and a sectional enlarged explanatory view of a part thereof is shown in FIG. 5. In this embodiment, it was employed an alignment layer as a conductive layer, an ITO film was formed on the outer side of the counter substrate 8 and an ITO film was further formed on the outer side of the electrodes substrate. Electrodes were patterned on the glass substrate 7*b* similarly to Embodiment 1.

Manufacturing processes of this liquid crystal display device will now be explained. By methods similar to those of Embodiment 3, an ITO film as well as comb-like shaped electrodes 4 were formed on the glass substrate 7*b*. The sheet resistance of the ITO film was 5.5 kΩ. The width of the comb-like electrodes was set to be 5 μm, and the interval between the electrodes was also set to be 5 μm. A counter substrate 8 formed with an alignment layer 1*b* of polyimide (AL1034, manufactured by Japan Synthetic Rubber Co., Ltd.) having a thickness of 800 Å was provided with an ITO film on a surface opposite to a surface formed with a color filter. The sheet resistance of this ITO film was 900 Ω. On this substrate, an alignment layer made of polyphenylene vinylene was formed to assume a film thickness of 800 Å. The sheet resistance of this alignment layer material was $3.5 \times 10^{12}$ Ω. Rubbing treatments were performed for these two substrates. The rubbing directions were identical to those of Embodiment 1. Then, both substrates were overlapped such that the cell gap was 5 μm, and such that the rubbing directions were anti-parallel to each other, and liquid crystal composition ZLI-2293 was injected. The injection inlet was sealed, and a polarizer was adhered. The adhering directions of the polarizers were identical with those of Embodiment 1.

In the liquid crystal display apparatus manufactured in the above described manner, the counter substrate was provided with an alignment layer having a sheet resistance of $3.5 \times 10^{12}$ Ω on the side of the electrodes substrate, an ITO film having a sheet resistance of 900 Ω on the outer side thereof, and on the outer side of the electrodes substrate, the ITO film had a sheet resistance of 5.5 kΩ. The manufacturing processes were not different from conventional processes for manufacturing liquid crystal display apparatuses. In this manner, it was possible to achieve favorable display without afterimages similar to Embodiment 1 in the liquid crystal display apparatus according to the present invention.

COMPARATIVE EXAMPLE 1

Figure 15:
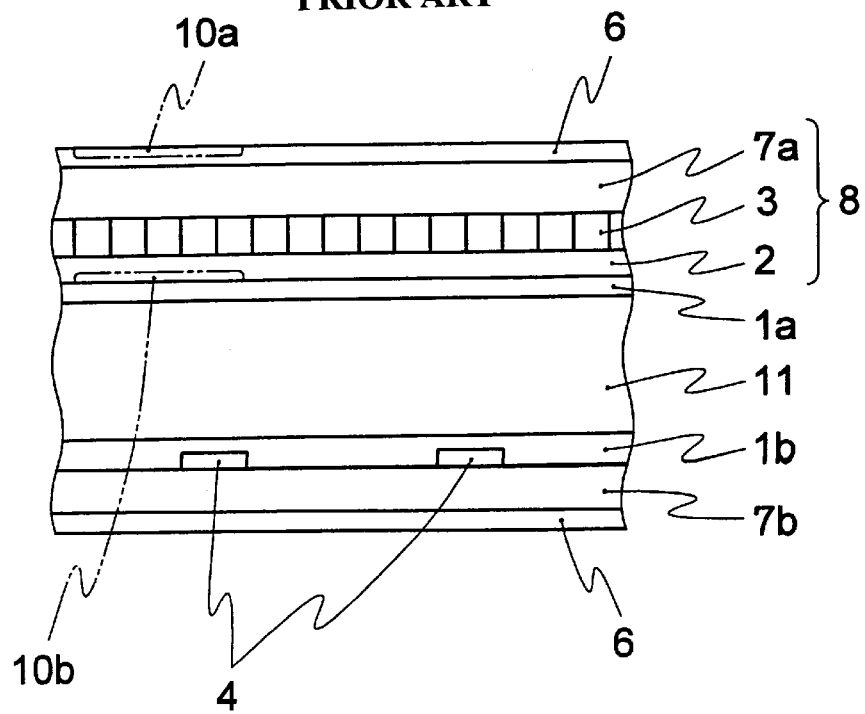
FIG. 15 is a sectional view showing a conventional in-plane switching liquid crystal display apparatus.

FIG. 15 is a sectional explanatory view of a liquid crystal display device according to an comparative example thereof. In this comparative example, the substrate on which there were formed comb-like shaped electrodes did not have a conductive layer as shown in FIG. 15. The counter substrate 8 was a counter substrate similar to that of Embodiment 5. Electrodes were patterned on the glass substrate 7*b* similarly to Embodiment 1.

Manufacturing processes of this liquid crystal display device will now be explained. The substrate with comb-like shaped electrodes was manufactured similarly to Embodiment 5. The counter substrate 8 was arranged to be identical with that of Embodiment 1. For the alignment layer, polyimide (AL1034, manufactured by Japan Synthetic Rubber Co., Ltd.) was employed. The rubbing directions were identical to those of Embodiment 5. Then, these two substrates were overlapped such that the cell gap was 5 μm, and such that the rubbing directions were anti-parallel to each other. Liquid crystal composition ZLI-2293 was injected to obtain the liquid crystal display apparatus. The polarizer was identical to that of Embodiment 3, and the adhering directions of the polarizers were identical with those of Embodiment 1.

Since the electrodes substrate of the liquid crystal display apparatus manufactured as above described was not provided with conductivity, electric charge was partially stored on the substrate surface and appeared as afterimages. The display quality was degraded, and no favorable display could be obtained.

The liquid crystal display apparatus according to the first aspect of the present invention is comprised of an array substrate, a counter substrate, and liquid crystal that is interposed and held by a space formed by maintaining the array substrate and the substrate at a predetermined interval in a parallel manner, the liquid crystal display apparatus being of in-plane switching in which voltage is applied on a pair of electrodes disposed on the array substrate to generate an electric field substantially parallel with respect to the array substrate surface and in which liquid crystal is driven through in-plane switching of liquid crystal molecules, wherein the array substrate is formed with a conductive film layer on a surface opposite to the surface on which the pair of electrodes are disposed. With this arrangement, electric charge is hardly stored and favorable display without afterimages can be obtained.

In the liquid crystal display apparatus according to the second aspect, the resistance of the conductive film layer is not less than 10 $\Omega$ and not more than $1\times10^{10}$ $\Omega$, whereby electric charge can be diffused.

In the liquid crystal display apparatus according to the third aspect, the counter substrate is conductive, whereby partial storage of electric charge can be prevented, favorable display without afterimages can be obtained.

In the liquid crystal display apparatus according to the fourth aspect, substantially the whole surface of a first surface of the counter substrate which opposes the array substrate is conductive, whereby electric charge can be reliably diffused.

In the liquid crystal display apparatus according to the fifth aspect, substantially the whole surface of a second surface of the counter substrate on an opposite side with respect to the first surface which opposes the array substrate are conductive, whereby the liquid crystal layer is hardly affected, and partial storage of electric charge can be prevented.

In the liquid crystal display apparatus according to the sixth aspect, substantially the whole surface of the first surface of the counter substrate which opposes the array substrate and the second surface of the counter substrate on the opposite side with respect to the first surface are conductive, whereby diffusion of partially residing electric charge can be promoted.

What is claimed is:

1. A liquid crystal display apparatus comprising:

an array substrate;

a counter substrate; and a liquid crystal interposed and held by a space formed by maintaining the array substrate and the counter substrate at a predetermined interval in a parallel manner, wherein the liquid crystal display apparatus is of in-plane switching in which voltage is applied on a pair of electrodes disposed on the array substrate to generate an electric field substantially parallel with respect to an array substrate surface and in which liquid crystal is driven through in-plane switching of liquid crystal molecules, and wherein substantially the whole surface of a first surface of the counter substrate which opposes the array substrate and a second surface of the counter substrate on an opposite side with respect to the first surface is conductive.

2. The liquid crystal display apparatus of claim 1, wherein the array substrate includes a conductive film layer on a surface opposite to the surface on which the pair of electrodes are disposed.

3. The liquid crystal display apparatus of claim 2, wherein the resistance of the conductive film layer is not less than 10 $\Omega$ and not more than $1\times10^{10}$ $\Omega$.

* * * * *